May 28, 1929.   W. B. TUNSTALL ET AL   1,714,576
ELECTRIC MOTOR CONTROL
Original Filed Oct. 26, 1922   2 Sheets-Sheet 2
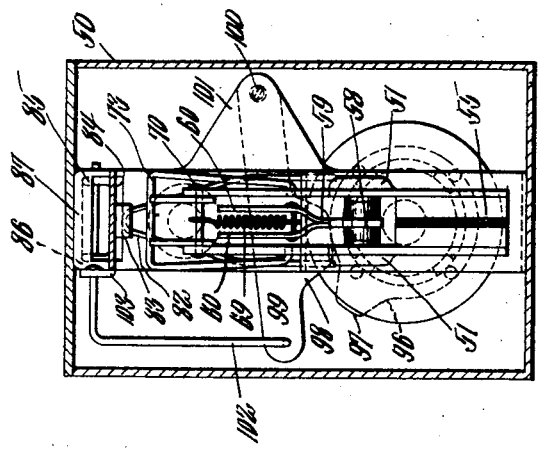
Inventors
William B. Tunstall
Henry H. Wright Patented May 28, 1929.

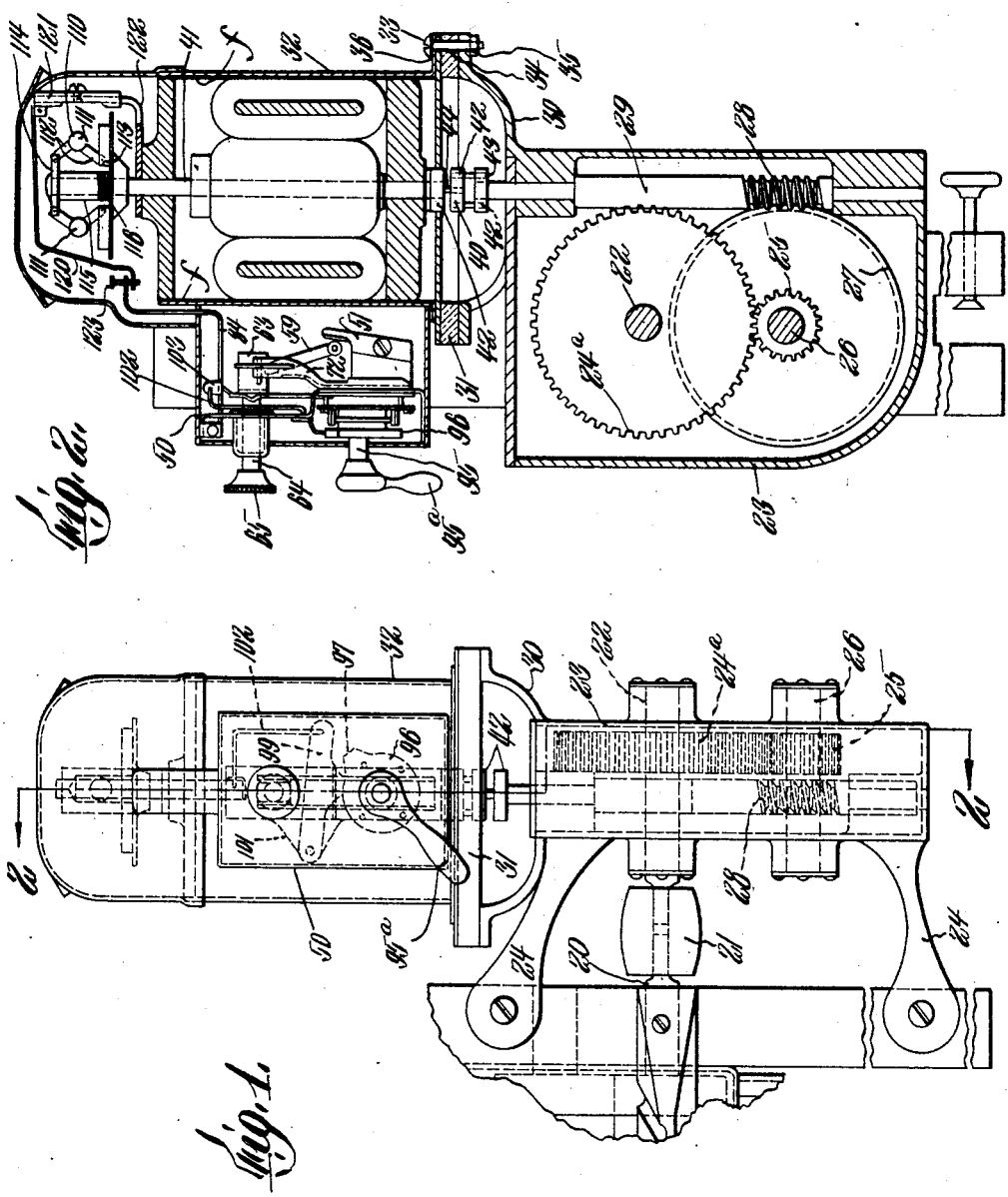

1,714,576

UNITED STATES PATENT OFFICE.

WILLIAM B. TUNSTALL AND HENRY H. WRIGHT, OF WORCESTER, MASSACHUSETTS.

ELECTRIC MOTOR CONTROL.

Original application filed October 26, 1922, Serial No. 596,945. Divided and this application filed July 30, 1925. Serial No. 47,055.

This invention relates to electric motor control mechanism having been more particularly designed for high speed series motors subjected to severe and unskillful usage, one commercial application of such a motor and controller mechanism being for driving domestic power wringers as more fully disclosed in our application for Patent Serial No. 596,945, filed October 26, 1922, for wringer and drive therefor, of which the present application is a division.

In power driven wringers it is desirable to provide for turning the rollers in opposite directions, so that articles which may have been started through incorrectly may be fed out from the rollers in the reverse direction. It is also desirable that the machine shall stop in case too great a resistance is encountered, so as to prevent overloading the motor which would be liable to cause it to be burned out.

In order to avoid the necessity of a reversing clutch mechanism, this invention provides means for reversing the direction of rotation of the motor by reversing certain electrical connections thereto, and in order to avoid the use of friction mechanism slipping under too great a load to safeguard the motor, mechanism acting when the speed of the motor becomes reduced to a predetermined value to open the main motor circuit. Besides being somewhat bulky, friction mechanism is uncertain in its action since the surface conditions of the friction faces may vary from time to time and the parts must therefore be capable of adjustment, which, if not correctly done, may cause the machine to refuse to handle a proper load or to fail to relieve the motor on a dangerous overload. By depending on the speed of the motor its release from the load at the proper time is made certain. By reversing the motor electrically there is no danger of stripping gears or of injuring other driving parts.

This invention therefore employs for the motor control a main switch actuable by hand to start and stop the motor, a reversing switch also hand operated for reversing the direction of rotation of the motor, and a speed control mechanism acting to throw out the main switch when the motor slows down to a predetermined speed such as would be caused by a sufficiently heavy overload.

For a more complete understanding of this invention, reference may be had to the accompanying drawings in which Figure 1 is a side elevation of the drive mechanism shown as attached to a wringer, a portion of which is indicated.

Figure 2 is a section on line 2—2 of Figure 1.

Figure 3 is an enlarged detail partly in section of the motor control switches.

Figure 4 is a section on line 4—4 of Figure 3.

Figure 5 is a fragmentary detail of a portion of the main switch.

Figure 6 is a somewhat diagrammatic view of the reversing switch.

In order that the drive mechanism for the wringer may be as compact as possible a high speed motor is employed, preferably one running at approximately 10,000 R. P. M. and preferably of the series type capable of operating with either direct or alternating current. The motor, together with reduction gearing to drive the wringer rolls at from 40 to 50 R. P. M., is intended to be made fast to the wringer frame in a detachable manner, and, due to the fact that the wringer rolls in operation are wet and are often in electrical contact through the wet clothing being operated upon with the tub, it is desirable to insulate the drive mechanism completely from the wringer.

The drive shaft 20 of the wringer has shown fixed thereto a coupling member 21, preferably of bakelite or similar insulating material, through which motion is transmitted thereto from a drive shaft 22. This drive shaft 22 is journaled in a gear casing 23 which is made fast to one end of the wringer by means of bracket arms 24 attachable by screws thereto. The shaft 22 as shown carries a large gear 24$^a$ with which meshes a pinion 25 fixed to a shaft 26 also journaled in the gear casing. This shaft 26 has fixed thereto a large worm wheel 27 which meshes with a worm 28 on a vertically arranged shaft 29 also journaled in the gear casing and extending upwardly through its upper end. By means of the reduction gearing shown, the high speed of the motor is brought down to a speed suitable to drive the wringer rollers. Mounted on the gear casing and about this shaft 29 is a bracket member 30 on which is supported the motor and controlling mechanism.

In order to insulate this mechanism from the wringer a collar 31 of insulating material is supported directly on the bracket 30 and on this collar is carried the motor casing 32 from which the motor thereof is insulated by a sheet of fiber $f$ wrapped about the motor and forming an insulating sleeve within the casing. Bolts or screws 33 engaging the motor casing pass downwardly through insulating sleeve 34 and have fixed at their lower ends the nuts 35, an insulating washer 36 being interposed between the head of each screw and the motor casing. In order that the drive shaft 29 may also be insulated a coupling member 40 for coupling it to the motor shaft 41 is shown. This coupling comprises disks of leather or other insulating material 42, the lower disk being connected to the intermediate disk by a pair of drive pins 43 and the intermediate disk being coupled to the upper disk by a pair of similar pins 44. This construction insures complete insulation between the armature shaft and the shaft 29.

Fixed to one side of the motor casing is a controller casing 50 which houses a main switch for controlling the motor, a reversing switch for reversing its direction of rotation, and a portion of the mechanism for opening the main switch on an overload. The main switch may be of any suitable type but as herein shown is a snap switch comprising a pair of contacts 51 (see Figures 3 and 4) separated by insulation 55 and which are bridged at certain times by a pair of contact rolls 56 engaging side faces of the contacts 51, these rolls being fixed to a connecting pin 57 of conducting material which furnishes a pivotal connection through an insulating bushing 58 with a lever 59. This lever is bifurcated at its upper end to form a pair of arms 60 each having a slot at its upper end, as shown at 61 in Figure 5, fulcrumed on a lug 62 projecting inwardly from opposite sides of a U shaped frame plate 63. This frame plate 63 is fixed to the inner end of a rod 64 which passes through the front wall of the switch casing 50 and has fixed to its outer end an actuating knob 65. The switch arm or lever 59 is provided with a pin 68 bridging the side pieces 60 to which pin between the side pieces is fixed one end of a spring 69. The opposite end of this spring is fixed to a pin 70 which passes through a slot 71 in the frame member 63 and is fixed at opposite ends in rigid upstanding frame members 72. A bail shaped pivot member 73 passes over the top of the frame piece 63 resting in a slot 74 therein, and its lower ends are bent inwardly to engage in perforations as at 75 in the rigid frame member 72. These parts are so proportioned that when the knob 65 is pulled outwardly in the position shown in Figures 3 and 5 the fulcrum lugs 62 for the switch arm 59 are brought forwardly of the pin 70 so that the spring 69 acts to hold the rollers 56 against the contacts 51. By pressing the knob 65 inwardly the lugs 62 are moved to the other side of the line connecting the spring pins 68 and 70, whereupon the spring acts to throw the switch arm away from the contacts 51 to break the circuit.

Means are herein shown for normally urging the actuating rod 64 into switch-releasing position, such means comprising a spring 80 fixed at its lower end as at 81 and at its upper end 82 engaging the frame member 63 and urging it toward switch open position. This spring may be held out of operative position, however, by a finger portion 83 bent downwardly from a strip 84 so as to engage against the rearward face of the spring. This strip or bar 84 is formed immediately back of the front face of the switch casing with a pair of upstanding spaced ears 85 mating similar downwardly turned ears 86 of a frame plate 87 fixed to the casing. Through these ears is passed a pintle pin 88 by which means the forward end of the strip 84 is pivotally supported. This strip 84 may be actuated by mechanisms later described to release the portion 83 from the spring 82 to cause the main switch to be opened.

The reverse switch may be of any suitable type but as herein shown (Figure 6) comprises a disk 90 having spaced conductor segments 91 which may be turned into registry with two sets of contacts 92 and 93. One of these sets of contact leads either to the field or armature terminals of the motor, the other set leading to the source of power. By rocking the disk 90 between the full line position and the dotted line position shown in Figure 6, each contact 92 may be brought into electrical connection with either of the contacts 93, as desired, in order to reverse the connections for either the armature terminals or the field terminals to reverse the direction of the motor in a well understood manner. As this motor is of extremely high speed it is important that the electrical connections thereto be broken before the reverse connections are made in order to prevent damage to the motor. For this reason provision is made for automatically opening the main switch when the reverse switch is actuated so that the reverse energy flow may not suddenly be thrown on the motor when it is revolving in one direction. For this purpose the disk 90, which is attached to an actuating rock shaft 95, has fixed to rock therewith a cam plate 96. This cam plate has a cam projection 97 thereon which is adapted to contact a mating projection 98 on a cam lever 99 pivoted at 100 to a fixed frame member 101. The free end of this arm 99 has engaged therewith a rod 102 whose upper end engages in a pair of ears 103 projecting from the strip 84. When the cam projection 97 engages the portion 98 this lever is rocked upwardly about its pivot 88 to release the spring 82, whereupon it may act to force the main switch to open position. If desired the frame member 87 may be a part of the member 101. Should it be attempted to reverse the rotation of the motor by turning the rock shaft 95 as by means of the handle 95ª, the main switch is thrown out before the reversing switch acts to effect reverse connections for the motor. It is therefore necessary to throw in the main switch by hand and sufficient time is therefore provided before this can be accomplished for the motor to stop or at least to slow down considerably before the circuit may be again made to drive it in the reverse direction. This construction, therefore, acts as a safety device to prevent sudden reversal of the motor when it is running at high speed.

In case an overload is applied to the motor its speed is slowed and advantage is taken of this reduction in speed to cause the main switch to be thrown open to prevent the possibility of burning out the motor by the heavy current passing therethrough due to the overload. For this purpose the upper end of the armature shaft 41 carries a speed responsive device of any suitable character. Such a device as shown comprises a ball governor mechanism shown at 110 in Figure 2. This comprises a pair of ball weights 111 each pivoted to a pair of links 112. The lower links 112 are pivoted to a plate 113 fixed to the shaft 41 and the upper links 112 are pivoted to a plate 114 carried by a sleeve 115 axially slidable on the shaft 41. A spring 116 normally urges this sleeve upwardly so that its upper end, which is formed rounded, impinges on a strip 120 passing thereover and slidably connected at one end to a member 121 which at its other end is fixed to a plate 122 resting on the motor casing and through which the shaft 41 passes. The opposite end of the strip 120 is adjustably coupled by means of a screw 123 to the upper end of the strip 84. When the speed of the motor is slowed to a predetermined value, therefore, the spring 116 raises the strip 120 which acts to raise the strip 84 to remove the portion 83 from in front of the spring 82 which thereupon acts to open and maintain open the main switch. When the knob 65 is pulled outwardly to close the main switch the motor is caused to start and when a sufficiently high speed has been reached sleeve 115 is retracted by the centrifugal action of the ball mechanism 110, permitting the strips 120 and 84 to fall so that the latch member 83 engages back of the spring 82. The knob 65 is now released, and the spring 82 is prevented by this latch from throwing the switch to open position.

Having thus described an embodiment of this invention, it should be evident to those skilled in the art that many changes and modifications might be made therein without departing from its spirit or scope as defined by the appended claims.

We claim:

1. In a device of the class described, a motor, a main switch for said motor, a reversing switch for said motor, means for opening said main switch when said reversing switch is actuated to reverse said motor, and a motor overload protecting device acting automatically on the reduction of the speed of the motor to a predetermined value to open the main switch independently of the reversing switch, whereby the motor is stopped.

2. In a device of the class described, a motor, a main switch for said motor, means tending to open said main switch, means for holding said opening means inoperative, a reversing switch operatively associated with said main switch whereby when said reversing switch is reversed said means for holding said opening means inoperative is released, and a device responsive to the speed of the motor acting to release said holding means at a predetermined motor speed independently of said reversing switch.

3. In a device of the class described, a motor, a main switch for controlling said motor, spring means tending to open said main switch, a latch for holding said opening means inoperative, a reversing switch for reversing the direction of rotation of said motor and acting when actuated to break and to then make certain electrical connections thereto, and a cam on said reversing switch acting to release said latch when said reversing switch is actuated and before such circuit connections are made thereby.

4. In a device of the class described, a motor, means including a main switch for controlling said motor, means including a reversing switch for reversing the direction of rotation of said motor, said main switch including means tending to maintain it in open position, a latch for holding said main switch closed, and means for releasing said latch when said reversing switch is actuated.

In testimony whereof we have affixed our signatures.

WILLIAM B. TUNSTALL.
HENRY H. WRIGHT.